United States Patent [19]
Lazarev et al.

[11] 3,843,262
[45] Oct. 22, 1974

[54] METHOD OF DIAGNOSING HEAD LAMPS OF TRANSPORT VEHICLES AND A DEVICE FOR CARRYING SAME INTO EFFECT

[76] Inventors: Leonid Lazarevich Lazarev, ulitsa Pobedy, 19, kv. 30, Moskovskaya oblast; Leonid Grigorievich Novakovsky, Chernitsynsky proezd, 8, kv. 119; Boris Aronovich Roitman, Federativny prospekt, 6, korpus 6, kv. 51, both of Moscow, all of U.S.S.R.

[22] Filed: Jan. 2, 1974

[21] Appl. No.: 431,406

Related U.S. Application Data

[63] Continuation of Ser. No. 340,745, March 13, 1973, abandoned.

[52] U.S. Cl. .................... 356/121, 356/153, 33/288
[51] Int. Cl. .......................................... G01b 11/27
[58] Field of Search ....... 356/121, 153, 154; 33/288

[56] References Cited
UNITED STATES PATENTS
2,291,114  7/1942  Squyer ............................ 356/121
2,958,134  11/1960  Wilkerson ...................... 356/121 X

FOREIGN PATENTS OR APPLICATIONS
1,099,963  2/1961  Germany ........................... 356/121
166,762  4/1959  Sweden .............................. 356/121

Primary Examiner—Ronald L. Wibert
Assistant Examiner—Paul K. Godwin
Attorney, Agent, or Firm—Holman & Stern

[57] ABSTRACT

The device comprises a photometric head fixed on a movable stand. Held to the photometric head is a system for orienting the device with respect to the longitudinal axis of the transport vehicle. The orienting system has two reflecting faces and is made as a polyhedral optically transparent prism, or as two mirrors, one of the faces of the prism or one of the mirror being provided with a rectangular graticule, one cluster of lines thereof being arranged along the optical axis of the photometric head. While in operation, the device is positioned opposite the transport vehicle, whereupon a portion of the vehicle is selected, that is arranged either lengthwise or crosswise the longitudinal axis of the vehicle, and the image of the portion is brought in alignment with one of the lines of the rectangular graticule of the orienting system.

3 Claims, 4 Drawing Figures

METHOD OF DIAGNOSING HEAD LAMPS OF TRANSPORT VEHICLES AND A DEVICE FOR CARRYING SAME INTO EFFECT

This is a continuation, of application Ser. No. 340,745, filed Mar. 13, 1973 now abandoned.

BACKGROUND OF THE INVENTION

This invention relates to methods and devices for checking photometric characteristics and setting the head lamps of transport vehicles, viz., automobiles. Most effective applications of the present invention are the sphere of automobile service, including diagnosing centers and inspection checks of head lamps at stations or on routes.

At present there are known methods for diagnosing automobile head lamps and devices for their realization, comprising a photometric head fixed on a movable stand and incorporating a lens, a screen with a photocell and an electric measuring instrument and a system for orienting the photometric head with respect to the automobile.

Principal differences between the known devices lies with the fact that they make use of various types of orienting system. This is accounted for just by the concept that underlies the design of the orienting systems in the head-lamp diagnosing devices is responsible for both the accuracy and throughput capacity of a device when in practical use.

In one of the known types of such device use is made of a mechanical concept for construction of orienting elements. According to this concept, by using some mechanical elements or other, as a rule of an intricate design, the photometric head is brought to the position, wherein its optical axis is aligned with the automobile longitudinal axis. A disadvantage of such devices resides in the fact that they are cumbersome and have a low accuracy and throughput capacity.

In another type of the known devices use is made of an optical-levelling principle for construction of the orienting system.

Such a device is provided with two vacuum-cup help optical marks and a telescope which is positioned coaxially with the photometric head. One of the vacuum-cup optical marks is held to the front windshield and the other, to the rear-seat windshield in such a manner that the line passing through the centers of both, are in the plane of the longitudinal symmetry of the automobile. Then the telescope is to be levelled against the optical marks first vertically, whereupon the entire device is levelled horizontally. The device suffers from a very low accuracy stemming from both its design and the degree of the operator's skill, as well as from the bulkiness of the device and from the fact that too much time is required for orienting it with respect to the automobile.

One more type of the device in current use is based upon the light-ray concept of constructing the orienting system, whereby the photometric head is oriented with respect to the automobile with the help of light rays that establish marks along the preselected direction of orientation.

Such devices suffer from the disadvantages that they need a power source and that the color of the light ray must be selected to suit the color of the automobile involved. Moreover making of many mistakes are unavoidable during the tuning up of the device.

SUMMARY OF THE INVENTION

It is an object of the present invention to provide such a method of diagnosing the head lamps of transport vehicles that will enable high-accuracy measurements to be obtained.

It is another object of the present invention to provide such a device for realization of the method of diagnosing the head lamps of transport vehicles that will be simple in design and convenient in operation.

These and other objects of the invention are attained due to the fact that in a method of diagnosing the head lamps of transport vehicles, residing in that the optical axis of a photometric head is aligned with the axis of the head lamp and set parallel with the longitudinal axis of the vehicles involved with the help of an orienting system of the photometric head, according to the invention introduced into the photometric head orienting system is a rectangular graticule which is oriented on the photometric so that one cluster of lines of the graticule is arranged along the photometric head optical axis, then the image of a portion of the vehicle is transmitted onto the graticle, the portion being arranged either lengthwise or crosswise the longitudinal axis of the vehicle, and the orienting process is carried out until the image of the vehicle portion either is brought into coincidence or in parallelism with one of the lines of the rectangular graticule, with the result that the optical axis of the photometric head is set parallel with the vehicle longitudinal axis.

In a device for carrying said method into effect, according to the invention the orienting system has at least two reflecting faces to one of which is applied a rectangular graticule, while the other face serves for transmitting the image of a portion of the vehicle onto said rectangular graticule.

In one of the embodiments of the present invention, the device has reflecting faces made as two mirrors to one of which a rectangular graticule is applied, while the other serves for transmitting the image of the vehicle portion onto said rectangular graticule.

Another embodiment of the present invention resides in that the reflecting faces are essentially the faces of a polyhedral optically transparent prism to one of whose faces is applied a rectangular graticule, while the other reflecting face thereof serves for transmitting the image of the vehicle portion onto the rectangular graticule.

The herein-proposed invention enables precision accuracy parallel orientation of the photometric head with respect to the automobile longitudinal axis. This advantage is due to a novel concept that underlies the construction of the orienting system. All current-use devices for the similar purpose are provided with an orienting system which must aimed by the operator directly at the orienting elements of the automobile under diagnosis.

It is precisely this fact that is responsible for a plurality of probable errors in orienting the device in the required position. Among the extrinsic causes are such as the length of the automobile under check, departure form its true vertical and horizontal position, irregularities of the floor, deviation from nominal size of the mechanical parts and components of the orienting system. Further, among the personal reasons of an operator are such as accommodative ability of the operator's eyes, normal acuity of his vision, etc. Due to these reasons, even the best of the known devices fail to attain adjusting accuracy practically higher than within 1°.

The proposed invention is simple in its implementation and convenient in service; it enables orientation of the photometric head with respect to the vehicle to be substituted by the orientation of the head with respect to the vehicle image which adds to the measuring accuracy and to the rate of the process of orienting the photometric head of the device with respect to the vehicle, as well as to the labor efficiency.

BRIEF DESCRIPTION OF THE DRAWINGS

Other objects and advantageous features of the present invention will be apparent hereinafter from a complete specification of the exemplary embodiments thereof and from the recital of the appended claims and drawings. In the drawings:

DETAILED DESCRIPTION OF THE PREFERRED EMBODIMENTS

Figure 1:
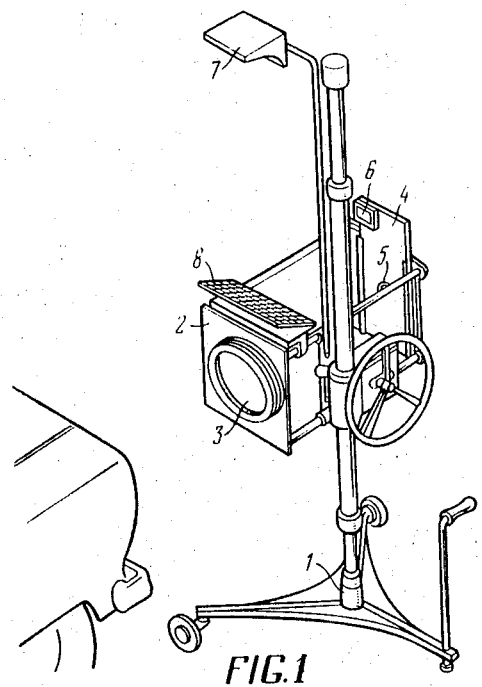
FIG. 1 is a general schematic view of a device for realization of the method, according to the invention.

Reference being now directed to FIG. 1, the proposed device comprises a movable stand 1, a photometric head 2 which incorporates a lens 3, a screen 4, a photocell 5 and an electrical measuring instrument 6, as well as an orienting system incorporating reflecting faces made as mirrors 7 and 8 positively linked with the photometric head 2. The latter is movable complete with the mirrors 7 and 8 along the rod of the movable stand 1 and can be swivelled horizontally round the rod.

Figure 2:
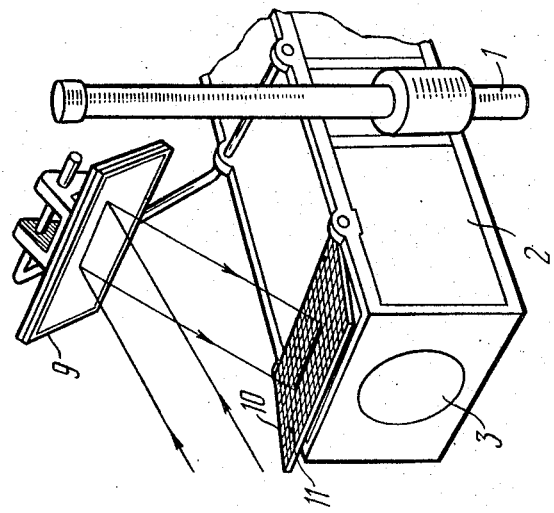
FIG. 2 shows an embodiment of the construction of same device, featuring an orienting system made as plane mirrors.

FIG. 2 illustrates an orienting system, wherein reflecting faces are made as plane mirrors 9 and 10.

As it is conventionally shown in FIG. 2 the mirror 9 projects the image of a portion of the automobile under check that is arranged either lengthwise or crosswise the automobile longitudinal axis, onto the mirror 10 to whose surface is applied a rectangular graticule 11, one cluster of lines of the graticule being arranged along the optical axis of the photometric head 2.

A principal characteristic feature of the embodiment of the device is that the image of an orienting element of the automobile body, projected onto the rectangular graticule 11 of the mirror 10, occurs to be a linear one of the apparent full size.

Figure 3:
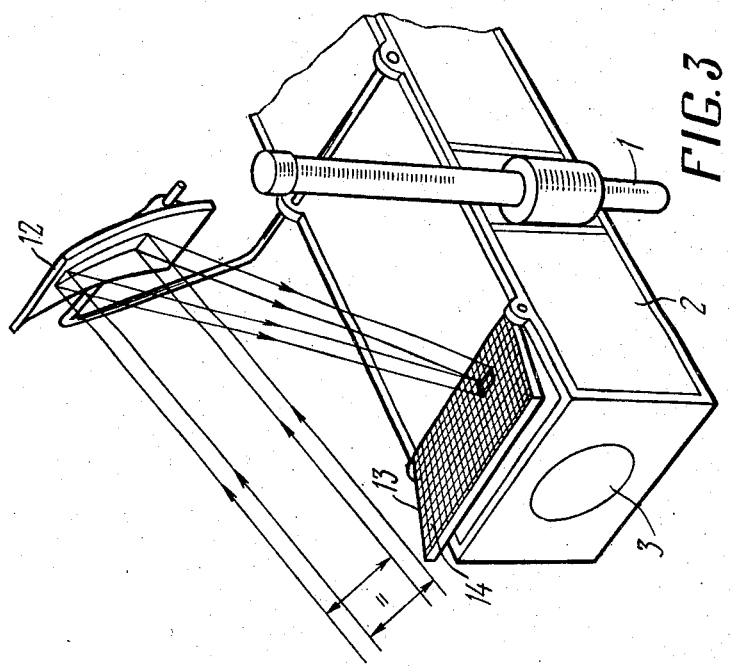
FIG. 3 shows an embodiment of the construction of same device, having an orienting system made as mirrors of which one is shaped after the 2nd order curve with a linear generatrix.

FIG. 3 represents another embodiment of the device, wherein the reflecting faces of the orienting system are made as a mirror 12 shaped as a 2nd order curve with a linear generatrix, and a plane mirror 13 bearing a rectangular graticule 14, one cluster of lines of which being arranged along the optical axis of the photometric head 2.

As it is purposely shown in FIG. 3, the mirror 12 projects a fragment of the image of the automobile under check onto the mirror 13, the image being scaled-down only in a direction coinciding with the radius-vector of the curve of the mirror 12, whereas in the direction of the linear generatrix of the mirror 12 both the scale and linearity of the image remain unaffected.

Thus, the principal characteristic feature of this embodiment of the device resides in that at any deviation of the optical axis of the photometric head from perpendicularly or parallelism with the orienting lines in the image of the automobile under check, the lines acquire nonlinear distortions whose amplitude in proportionate to the value of such a deviation.

Figure 4:
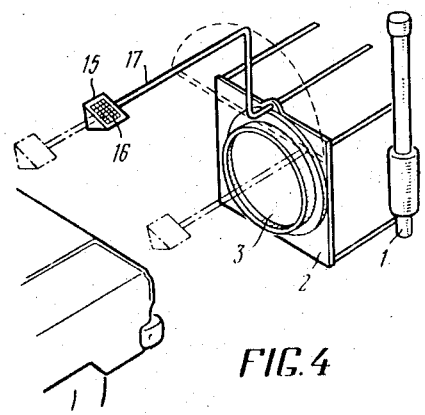
FIG. 4 shows an embodiment of the construction of same device, wherein an orienting system is made as a polyhedral optically transparent prism.

FIG. 4 shows one more embodiment of the device, wherein the orienting system is made as a polyhedral optically transparent prism 15 to one of whose faces a rectangular graticule 16 is applied in such a manner that one cluster of lines is arranged along the optical axis of the photometric head 2. The prism 15 is held to the photometric head 2 through a holder 17 which can swivel in the frontal plane so as to be positioned on one of the head lamps of the automobile.

The herein-proposed device operates as follows. The device (FIG. 1) is positioned opposite the head lamp under diagnosis at a distance of 0.4–0.5 m from the latter to the lens 3. The photometric head 2 is shifted along the rod 1 until it assumes the position, wherein the centers of the lens 3 and that of the head-lamp lens are vertically aligned. Then the mirrors 7 and 8 are set so that the image of the automobile under check can be seen in the mirror 8.

Further, depending upon what an embodiment of the orienting system is the case, the process of orienting the photometric head with respect to the automobile being diagnosed proceeds as follows.

For an embodiment of the device featuring plane mirrors (FIG. 2), the orienting portion of the automobile, say, the edge of the head-lamp moulding, transverse line of the hood, longitudinal line of the body, etc., is reflected by the mirror 9, in a general case, out-of-parallel with the rectangular graticule 11 applied to the reflecting surface of the mirror. Then by swivelling the photometric head 2 in a horizontal plane round the rod 1 one must aim for such a position, wherein the image of the orienting portion of the automobile in the mirror 10 coincides with one of the lines of the rectangular graticule 11 or is set in parallel alignment therewith. Thus, the device is ready for operation for checking and adjustment which are carried out by a conventional method.

For an embodiment of the device as represented in FIG. 3, upon an appropriate setting of the device against the head lamp, in a general case, the image of the orienting straight line as seen in the mirror 12, is somewhat curved, i.e., non-linear distortions take place. Then, similarly to the preceding case, the photometric head 2 is swivelled till the position, wherein no non-linear distortions are observed. This evidences that the device is ready for further operation.

For an embodiment of the device having its orienting system made as the prism 15, the device operates as follows. The photometric head 2 is positioned opposite the headlamp so that the centers of both be vertically aligned. By turning the swivel holder 17 in the appropriate direction, the prism 15 is positioned above the automobile portion selected for orientation (such as the top of the head-lamp lens, the edge of the headlamp moulding, the line of hood, etc.). Then, by swivelling the prism 15 the image of the automobile portion is brought in alignment with one of the lines of the rectangular graticule 16. This procedure is performed in two steps, viz., by turning the prism 15 round its own axis and by swivelling the photometric head 2 in a vertical plane.

The proposed device for realization of the method according to the present invention, is instrumental, when plane mirrors or a prism are used, in an accuracy to within 0.5°, and in the case of adjustment against non-linear distortions to within 0.3°.

This substantial achievement is ensured due to the use of an orienting system made as mirrors that eliminates many sources of errors, both extrinsic and personal, which are involved in the method of a direct aiming of the device at the automobile being diagnosed.

Inasmuch as in the proposed device the orienting of the position of the photometric head is made not against the automobile under diagnosis, but against its image on the rectangular reflecting graticule, no errors resulting from the length of the object, floor unevenness, accommodative ability of the eye, etc. occur.

Possible affecting by the parallax is obviated due to the fact that the rectangular graticule is applied to the same surface as the layer of a reflecting mirror coating.

The proposed device is also highly advantageous from the view-point of operating convenience, easiness of attendance, conveying and storage.

What we claim is:

1. A method of diagnosing the head lamps of transport vehicles, the method comprising the steps of:
   positioning a photometric head in front of the transport vehicle against the head lamps thereof;
   orienting the optical axis of the photometric head to be aligned with the axis of the head lamps and to be set in parallel with the longitudinal axis of the transport vehicles;
   providing at least two reflecting faces for orienting the optical axis of the photometric head, one of the two reflecting faces being formed with a rectangular graticule, the rectangular graticule being oriented on the photometric head so that the longitudinal cluster of lines of the rectangular graticule is disposed parallel to the vertical plane passing through the optical axis of the photometric head, the other cluster of lines of the rectangular graticule transversing the directions of the optical axis of the photometric head, the other one of two reflecting faces receiving the image of a selected portion of the transport vehicle and reflecting the image onto the other face formed with the rectangular graticule, the selected portion of the transport vehicle having an edge which is perpendicular to the longitudinal axis of the transport vehicle;
   turning the photometric head until the image of the selected portion of the transport vehicle reflected onto the face formed with the rectangular graticule becomes aligned with the transverse cluster of lines of the rectangular graticule so that the optical axis of the photometric head is set with the longitudinal axis of the transport vehicle;
   switching on the head lamp; and
   observing and checking the setting of the head lamp.

2. A device for diagnosing the head lamps of a transport vehicle, said device comprising:
   a photometric head being positioned in front of the transport vehicle against the head lamps thereof;
   means for orienting the optical axis of said photometric head to be aligned with the axis of the head lamps and to be set in parallel with the longitudinal axis of said transport vehicle, said orienting means having at least two reflecting faces, one of said at least two reflecting faces being formed with a rectangular graticule, said rectangular graticule being oriented on said photometric head so that the longitudinal cluster of lines of said rectangular graticule is disposed parallel to the vertical plane passing through said optical axis of said photometric head, the other cluster of lines of said rectangular transversing the direction of the optical axis of said photometric head, the other one of said at least two reflecting faces being adapted to receive the image of a selected portion of said transport vehicle and to reflect said image onto the other face formed with the rectangular graticule, said selected portion of said transport vehicle having an edge which is perpendicular to the longitudinal axis of said transport vehicle;
   said photometic head being turned until the image of said selected portion of said transport vehicles reflected onto the face formed with the rectangular graticule becomes aligned with the transverse cluster of lines of said rectangular graticule so that the optical axis of said photometric head is set parallel with the longitudinal axis of the transport vehicle;
   the head lamps being switched on; and
   the head lamp setting being observed and checked.

3. A device for diagnosing the head lamps of transport vehicles as claimed in claim 2, wherein said reflecting faces are formed as the faces of a polyhedral optically transparent prism, said prism having an axis of rotation parallel to said optical axis of said photometric head one of said faces being disposed with said rectangular graticule so that the longitudinal cluster of lines of said rectangular graticule is parallel with the axis of rotation of said prism and the transverse cluster of lines of said rectangular graticule which is perpendicular to the axis of rotation of said prism.

* * * * *